3,380,329
CONTINUOUS ROD CUTTER
George L. Mathe, Floyd G. Boothe, Jr., and Richie H. Dickerson, Richmond, Va., assignors to Philip Morris Incorporated, New York, N.Y., a corporation of Virginia
Filed Apr. 6, 1966, Ser. No. 540,691
17 Claims. (Cl. 83—169)

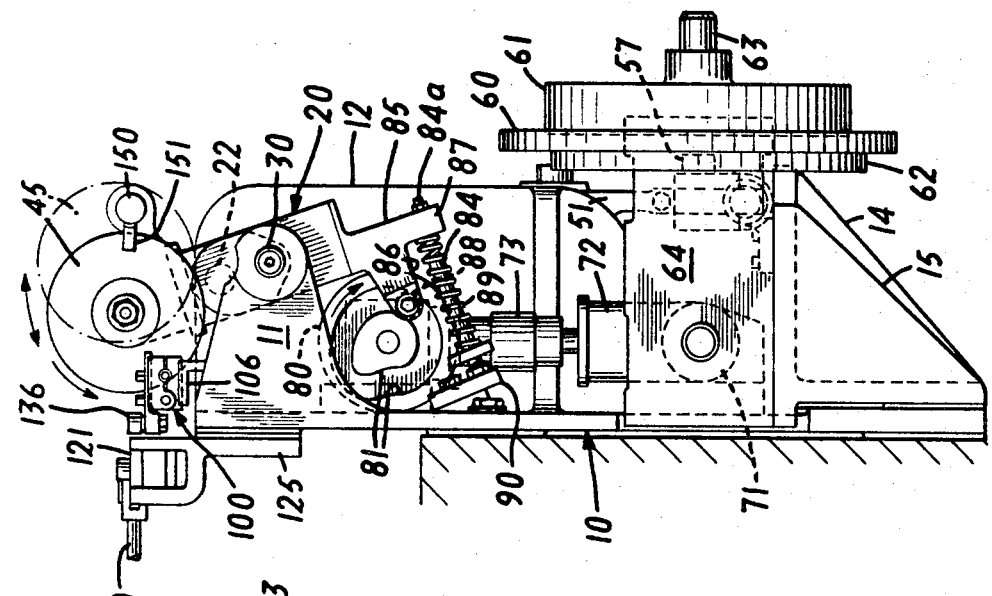
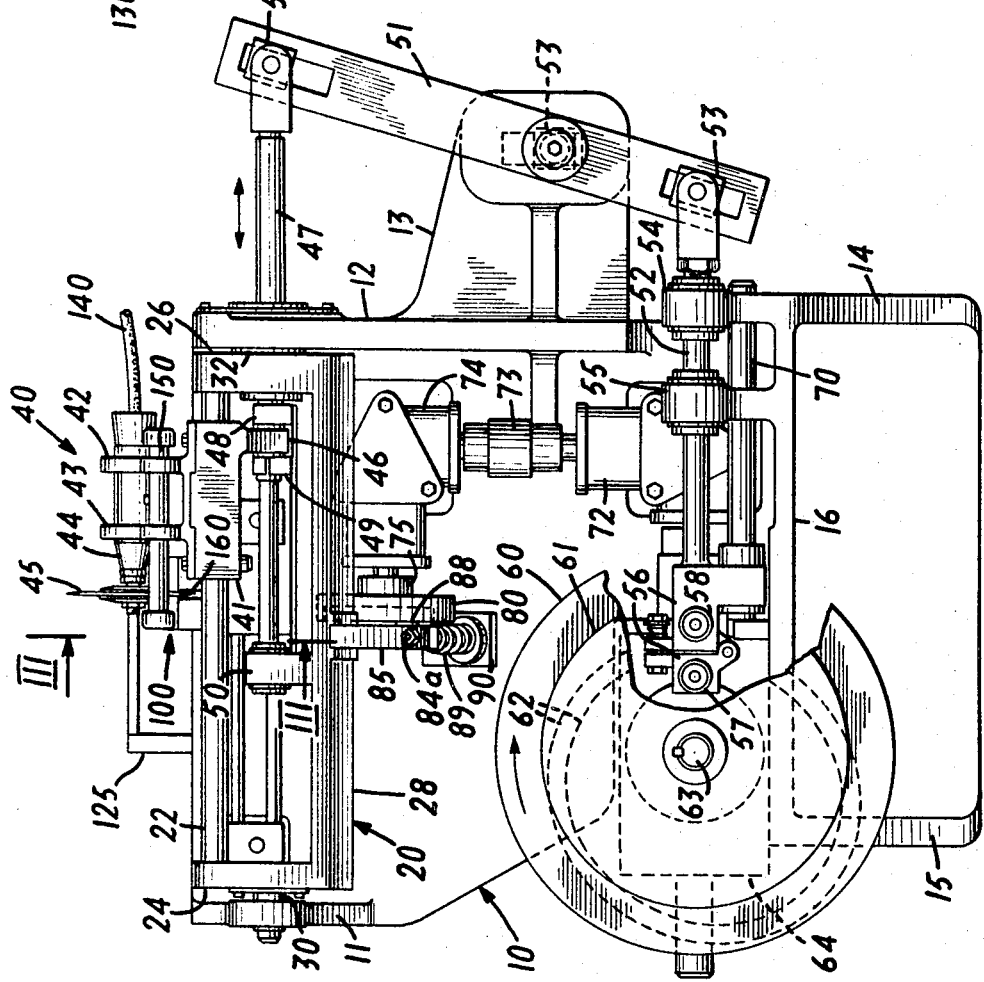

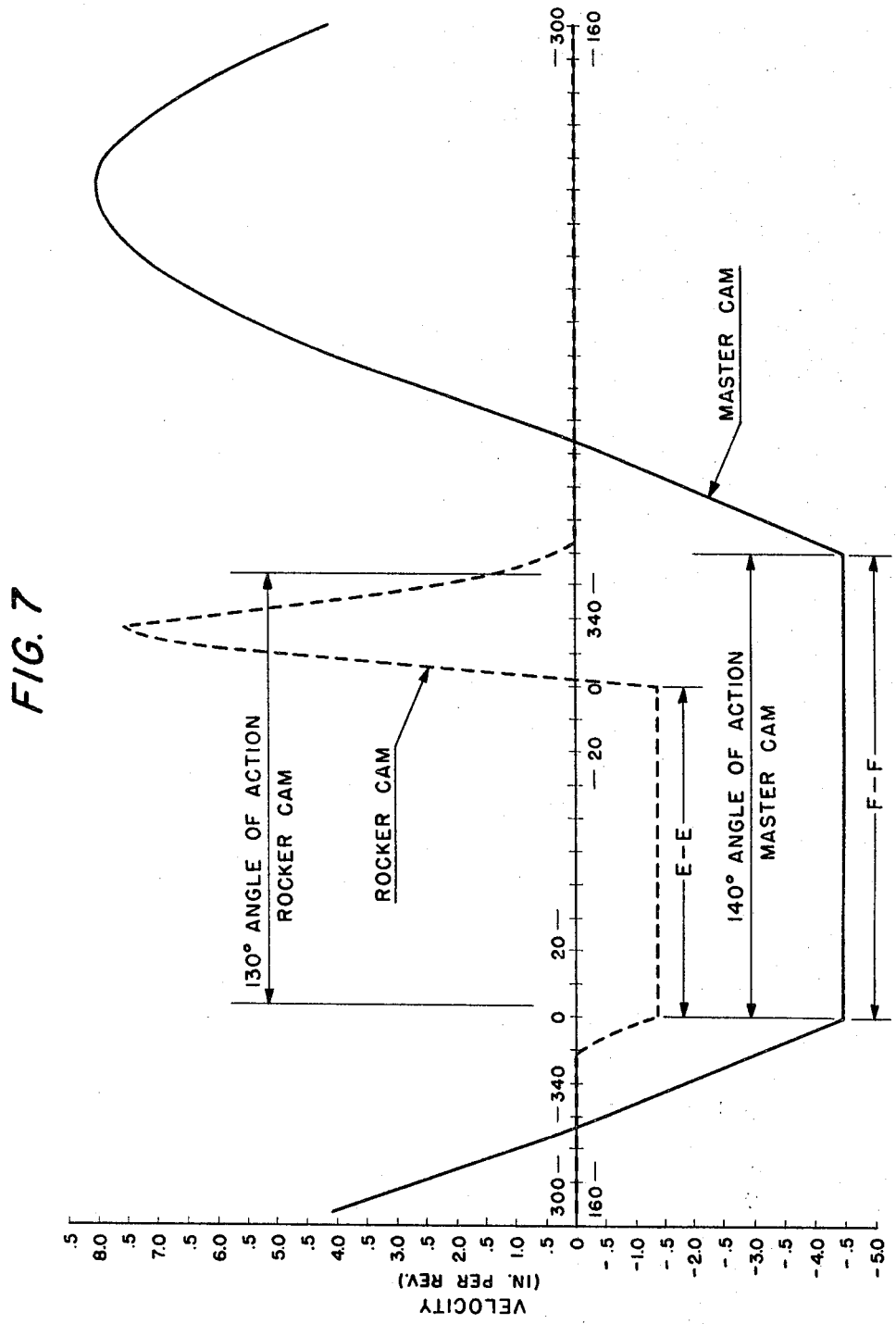

ABSTRACT OF THE DISCLOSURE

Apparatus suited for cutting a continuous length article advancing in a fixed longitudinal course at uniform speed into sections of predetermined length in which a rotary cutter blade rotatable in a plane transverse to said longitudinal course and its independent drive means are mounted on a rocker frame adjacent said longitudinal course for reciprocating movement parallel with said course, rotary cam means being used to reciprocate the rocker frame one cycle each time the article advances a distance equal to the predetermined length. Another cam means is employed to oscillate the rocker frame laterally of the longitudinal course one cycle concurrently with the reciprocating movement of the rocker frame to move the cutter blade into and out of cutting contact into the article, the other cam means impairing uniform velocity of oscillation to the rocker frame during the time the cutter blade is in cutting contact with the article. A clamping device is provided to hold the article during cutting and is reciprocated in unison with the rocker frame.

---

This invention is concerned with a rod cutter, particularly a rod cutter for cutting a continuous rod into sections of predetermined length as the continuous rod leaves the apparatus on which it is formed. The rod cutter is particularly useful for cutting continuous cigarette filter rod into sections of plural filter unit length to adapt them for use in automatic cigarette making machinery.

Cigarette filter rod is usually fabricated on high speed forming machinery the operation of which involves wrapping the filter material which may be a tow of natural material or synthetic fibers, in a continuous paper wrapper sheeet. Flavoring substances and/or additional filtration materials also may be included in the fabricated filter rod structure. Representative embodiments of the forming machinery are well known in the art and are capable of producing filter rod at outputs in excess of 300 feet per minute of rod. It is generally customary to direct the continuous filter rod, as soon as it leaves the forming machinery through a cutter device wherein it is cut into rod sections of a length equivalent to six to eight individual cigarette filter units, the rod sections then being delivered to the cigarette making machinery wherein the individual filter units are severed in known manner from the longer rod section and attached to tobacco cylinders to form filter cigarettes. The foregoing described machinery capacity therefore may involve cutting more than one thousand rod sections per minute and for that purpose special rod cutters have been devised. Known rod cutter types include rotary cutters as well as guillotine types. With the advent of the use of special synthetics for the filter material because they exhibit excellent filtration properties, problems have risen with respect to the quality of cut which can be achieved in these materials when employing prior art rod cutters. Specifically, the problems center around the fact that certain of these synthetic materials such as microfibers, are very sensitive to deformation caused by the pressure of the engagement of the cutter therewith. The fibers of the synthetics involved thus lacking resiliency, are caused to bundle together at one side of the formed rod structure thereby resulting in an out of roundness condition which makes the filter rod unsuitable for use as cigarette filters. Furthermore, the heat generated by the passage of the cutter through the filter material frequently causes thermal fusion of the fibers with consequent diminuation of its filtering properties.

The present invention relates to a rod cutter which overcomes the foregoing problems by utilizing a rotary cutter having a cutter blade which is operated in a very high r.p.m. resulting in an even, clean cutting through the formed rod structure without causing lateral deformation in and/or fusion of the filter material fibers. According to the invention, the cutter blade is operated by an independent drive means capable of rotating it at speeds in a range up to forty thousand r.p.m. The cutter blade and drive therefor are adapted to be mounted on a suitable support located adjacent the longitudinal course along which the continuous filter rod moves as it leaves the rod forming machinery and also includes means for reciprocating the cutter longitudinally of the filter rod course once each time the filter rod advances a distance equal to the length of the sections being cut therefrom. Means are also provided for oscillating the cutter into and out of cutting contact with the rod concurrently with the reciprocation thereof. Also, there is provided means in the form of a clamping ledger for clamping the rod during the actual cutting thereof, the clamping ledger being reciprocated in concurrent timed relation with the cutter blade. The arrangement and character of the foregoing means is such that during the time of actual cutting, the cutter blade, clamping ledger, and continuous rod move at the same longitudinal speed. Moreover, the cutter blade during cutting, moves through the filter rod at a constant velocity.

Various other objects, features and advantages of the present invention will be made apparent by the description that follows and the illustrative example depicted in the drawings. The invention accordingly comprises the apparatus embodying the features of construction, and combination and relation of parts which will be exemplified in the cutter apparatus hereinafter described and the scope of the invention will be indicated in the claims.

In the accompanying drawings:

FIGURE 1 is a front elevational view of a rod cutter for cutting continuous cigarette filter rod constructed in accordance with the principles of the present invention, some parts being broken away for purposes of illustration.

FIGURE 2 is an end elevational view of the cutter as viewed from the left in FIGURE 1.

FIGURE 7 is a graphical representation of the period of motion of the cams illustrated in FIGURES 5 and 6.

Throughout the description like reference numerals are used to denote like parts in the drawings.

Figure 3:
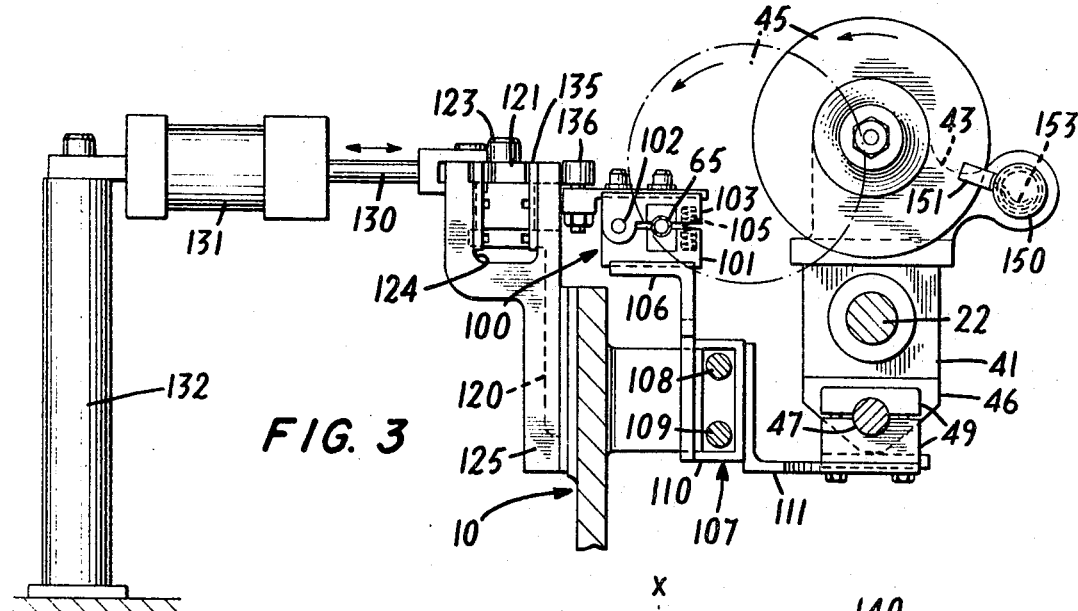
FIGURE 3 is a partial view on an enlarged scale of the upper portion of the cutter as seen in FIGURE 2 showing additionally, the air cylinder means used to control the operation of the clamping ledger.

The rod cutter depicted in the drawings is described herein by way of example for use in cutting continuous fabricated cigarette filter rods into sections of predetermined length in a continuous cutting operation as it leaves the machinery with which it is formed. However, it should not be construed thereby as being limited to that purpose only, as obviously, it is adaptable for sectioning other continuous articles of solid and hollow construction, particularly where the cutting operation must be effected with a clean straight through cut that does not cause physical deformation of the material of which the rod is made.

For convenience, the continuous rod cutter is preferably located in line with and adjacent to the machinery on which the continuous rod is formed, the latter being in the case of cigarette filter rod production of known construction. Thus, the cutter may be mounted on a common frame with the forming machinery or on any other suitable mounting means, as for example, an extension of the framing of the latter. The constructional details of the component elements of the rod cutter will first be described, followed by a description of the theory underlying its operational principles and finally, a description of its manner of use for cutting continuous cigarette filter rod into sections of predetermined length.

Referring to FIGURE 1 of the drawings, the rod cutter is adapted to be mounted on a main frame element 10 of suitable construction and having a number of bracket elements 11–16 extending outwardly therefrom. For convenience, the main frame 10 may constitute an extension of the filter rod forming machinery (not shown). The rod cutter includes a rocker frame 20 comprising as a unitary structure; an upper shaft 22, a pair of carriage sides 24, 26 and a lower carriage beam 28. The rocker frame 20 is pivoted at the left end in bracket element 11 by means of pivot 30 and at the right end in bracket element 12 by means of pivot tube 32 thus mounting the rocker frame for pivoting movement about an axis extending parallel to the longitudinal course X—X (FIGURE 4) along which the continuous filter rod advances during cutting.

The rocker frame 20 provides a mounting for a rotary cutter assembly 40, the rotary cutter assembly being adapted to slide longitudinally on the rocker frame and to rock therewith into and out of cutting contact with the cigarette filter rod as will appear. The rotary cutter assembly 40 includes an elongated block 41 which is centrally bored for mounting it for sliding movement on upper shaft 22 of the rocker frame. The block 41 carries a pair of ring brackets 42, 43 which as shown, provide a mounting means for an air motor 44. The air motor 44 is of known construction and is used to drive cutter blade 45, the capacity of the air motor being designed to rotate the cutter blade 45 in a speed range up to 40,000 r.p.m. Thus, the drive for the rotary cutter blade functions irrespective of the movements of the rest of the apparatus thereby avoiding creation in the latter of high inertial forces as would accompany said movements if the drive for the blade was derived therefrom. The arrangement of the cutter assembly is such that the cutter blade 45 is adapted to be rotated in a plane perpendicular to the course X—X along which the filter rod advances and also is adapted to be slid longitudinally of said course. Sliding reciprocating movement is imparted to the rotary cutter assembly 40 in the manner now to be described.

The elongated block 41 which is capable of sliding on upper shaft 22 is provided with an integral lower ear-like extension 46, which is bored to allow for passage therethrough of a rocker shaft 47, the latter being supported slidably in bracket element 12 of the overall frame support structure, the rocker shaft passing through pivot tube 32 as shown in FIGURE 1. Locking collars 48, 49 are mounted on the rocker shaft 47 on opposite sides of the extension 46 so that when the rocker shaft is reciprocated longitudinally as will be described, the entire rotary cutter assembly 40 is given a similar motion. The rocker shaft 47 extends a distance beyond the locking collars 48, 49 and is journalled at its left end in a bearing member 50 made integral with the lower main beam 28 of the rocker frame 20.

Reciprocation of the rotary cutter assembly longitudinally of the rod course X—X is effected by the means now to be described. The latter includes a pivot arm 51 pivoted intermediate its length in bracket element 13 of the main frame as best seen in FIGURE 1, the pivoting axis being transverse perpendicular to that of the rod course X—X. Rocker shaft 47 is connected to the upper end of the pivot arm as shown while the other end of the pivot arm is connected with a cam follower shaft 52. For adjusting or changing the stroke of the rocker shaft 47, the pivot arm 51 is provided with slide block connections 53 as shown so that the moment arm lengths of the linkage connected therewith may be changed. Cam follower shaft 52 is supported in bearing members 54, 55, which each are formed as an integral part of the bracket elements 14 and 16 of the main frame 10, the cam follower shaft 52 mounting being such that it is capable of sliding movement parallel with the longitudinal course along which the continuous rod advances. The cam follower shaft 52 has an enlarged end portion forming a split head 56 at the left end thereof and on which are supported a pair of follower rollers 57 and 58. Reciprocating motion is imparted to the cam follower shaft 52 and hence to the rotary cutter assembly by means of a master cam 60 which is mounted for rotation about an axis transverse perpendicular to the rod course X—X. The master cam 60 is a ribbon type cam and includes a hub portion 61 at the front side with the camming ribbon 62 being located at the rear, the ribbon 62 having an irregular cam profile which extends generally eccentrically of the cam body as shown in dashed lines in FIGURE 1 and being engaged at opposite sides thereof by the follower rollers 57, 58. Thus, the master cam 60 is adapted when rotated to impart to the cam follower shaft 52 a reciprocating motion which in turn is transmitted through the pivot arm 51 to the rocker shaft 47 causing reciprocating movement of the entire rotary cutter blade assembly 40. The master cam 60 is preferably driven from an output shaft 63 of a drive unit 64 of known construction and which can be controlled in known manner so as to rotate the master cam 60 one complete revolution each time the continuous filter rod 65 advances a distance equivalent to the length of the rod sections 66 being cut therefrom, and thereby cause the rotary cutter assembly to reciprocate one complete cycle. A cam follower guide shaft 70 is fixedly mounted at the lower part of the main support frame 10 for the purpose of guiding the cam follower shaft 52, the head 56 of the latter being slidably mounted on the guide shaft 70 as shown.

During the time the rotary cutter assembly 40 is being reciprocated one complete cycle, it is also rocked or oscillated one cycle laterally of the rod course X—X to move the cutter blade 45 into and out of cutting contact with the continuous rod 65. As may be best seen in FIGURE 3, the rocking movement imparted to the rotary cutter assembly 40 is that of an oscillation between the extreme positions generally shown in long and short dashed lines and in solid lines, representing respectively the maximum out of cutting contact position and the position of cutter blade 45 as it makes first cutting engagement with the filter rod 65. The oscillating motion imparted to the rotary cutter assembly 40 is produced by the means now to be described. Referring to FIGURES 1 and 2, the gear case 64 is provided with another output 71 at one side which is connected with a right angle drive unit 72 of known construction, the latter in turn being coupled as at 73 with another right angle drive unit 74. The output of the drive unit 74 is coupled as at 75 with a rocker cam 80, the rocker cam 80 being supported so as to rotate about an axis extending parallel with the continuous course of rod travel X—X. The rocker cam 80 is preferably a groove or track type having therein a camming groove 81 of irregular profile and is supported adjacent the lower part of rocker frame 20 to facilitate transmitting oscillating motion thereto. To that end, the lower carriage beam 28 is provided with a follower bracket 85 having a pair of arms 86 and 87 in one of which (86) is mounted a follower roller 88 which rides in the groove 81 of rocker cam 80. Thus, as the rocker cam 80 rotates the follower roller will follow the cam profile which is designed to impart oscillating movement to the rocker frame 20 and hence, the rotary cutter assembly 40 mounted thereon, the oscillations being one complete cycle for each revolution of the rocker cam. The other arm 87 of the bracket 85 is provided with a bore hole for receiving a pin 84a which is connected with one end of a compression spring 89, the other end of the spring being engaged against a stud mounting bracket 90 fixed to the main frame 10, as seen best in FIGURE 2. The stud 84 which is enclosed by spring 89 serves to support and guide same. Thus, the compression spring 89 acts normally against the arm 87 in such manner as to bias the rocker frame in a counter-clockwise direction as seen in FIGURE 2. The drive means for driving the rocker cam 80 is such that the rocker cam is rotated one complete revolution each time the master cam 60 is rotated one revolution to provide one cycle of movement of the cutter blade 45 into and out of cutting contact with the filter rod during the time the filter rod advances a distance equal to the length of the sections being cut therefrom. The rotary speeds of both the master cam 60 and the rocker cam 80, of course, may be controlled in known manner in accordance with the number of rod sections being cut per minute.

Master cam 60 is designed to have thereon a profile section which during the time the continuous filter rod 65 actually is being cut, imparts to the cutter assembly 40 and hence, cutter blade 45 a longitudinal speed which is equal to that of the speed of the continuous rod. Similarly, the rocker cam 80 has a profile section thereon which imparts an oscillating speed to the rotary cutter assembly of constant magnitude during the period the cutter blade is actually cutting through the filter rod. Further understanding of the reasons for the foregoing will be made apparent later in the description.

During the time that the continuous filter rod 65 actually is being cut, it is necessary to securely clamp it with suitable means in order to prevent any rotation or undue flexure of the rod. This is effected by providing a clamping ledger 100 the constructional details of which are shown in FIGURES 3 and 4.

The clamping ledger 100 is comprised of a pair of jaw members including a lower member 101 to which is pivoted as at 102, an upper member 103, the upper member thereby being swingable in a vertical plane between clamp and non-clamp positions. The upper and lower members are each provided with vertically directed aligned blind bore holes 104 in which are supported compression springs 105, the latter normally acting to urge the upper jaw member 103 in a counterclockwise direction as seen in FIGURE 3, moving the same to an open or non-clamp position. The lower jaw member 101 is fixedly supported as shown in FIGURE 3 on an angle member 106 forming part of a slide mounting bracket assembly 107 adapted to slide longitudinally of the filter rod course X—X on a pair of fixed slides 108 and 109 the fixed slides being located behind the rocker frame 20 and being securely mounted on the main frame structure 10 in known manner. The slide mounting bracket assembly 107 also comprises a sliding block 110 connected with angle member 106 and with a second angle member 111. The second angle member 111 also is connected fixedly with the lock collars 48 and 49. Thus, the clamping ledger 100 is connected with the rotary cutter assembly 40 to the extent that it is reciprocated in unison therewith. The clamping ledger does not however, oscillate as it is not connected in any manner to the rocker frame 20. It will be apparent that it is necessary that the clamping ledger 100 be actuated to a clamping position only during that period when the cutter blade 45 is actually cutting through the continuous filter rod 65. Clamping of the ledger jaw members during cutting is achieved by the means now to be described.

Figure 4:
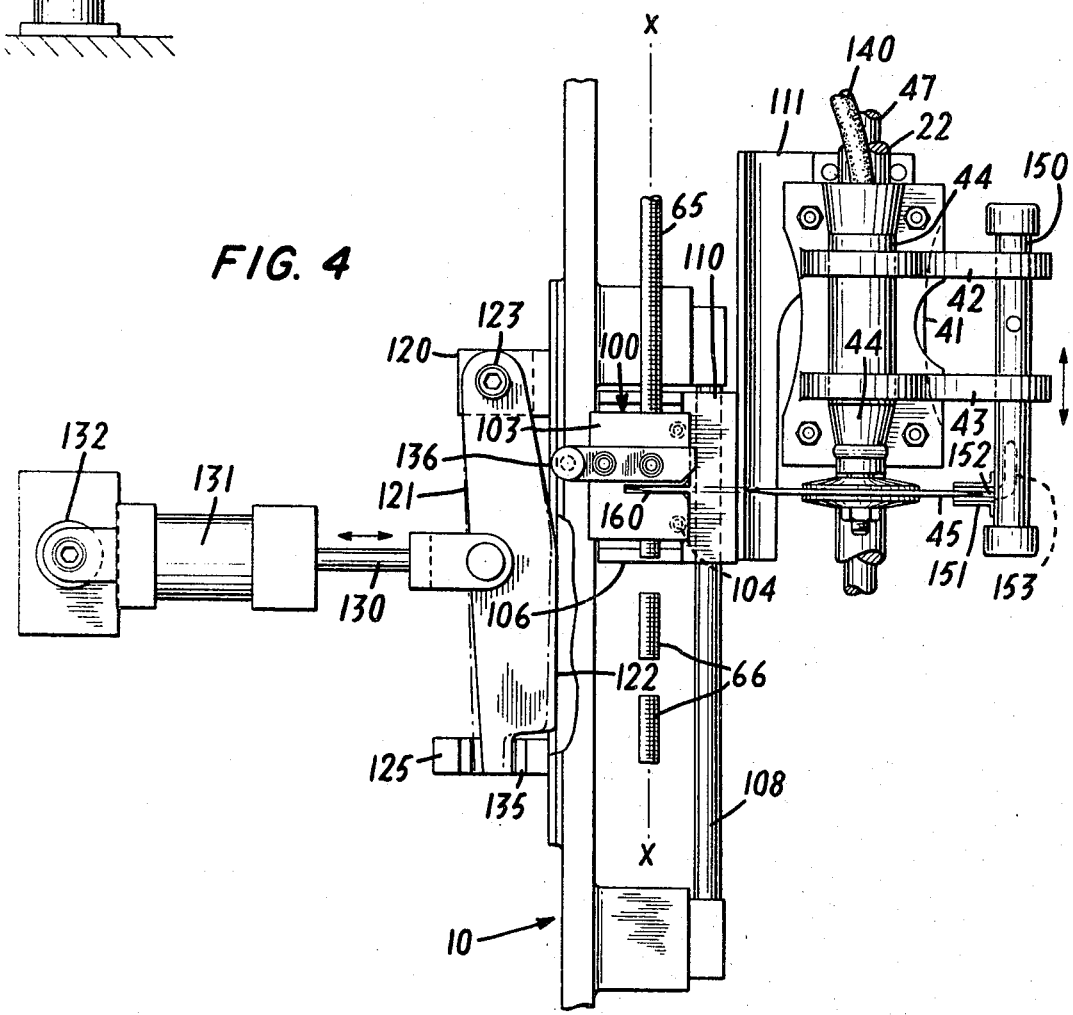
FIGURE 4 is a top plan view of FIGURE 3.

Mounted on main frame 10 is a ledger cam bracket 120 which extends upwardly behind the clamping ledger as shown in FIGURE 3 and on which is mounted a plate-like ledger cam 121 the front vertical side of which constitutes a camming surface 122. The ledger cam 121 is pivoted in one end as at 123 to the top of bracket 120 as may be best seen in FIGURE 4, with the other end of the ledger cam extending into the vertically slotted segment 124 of a stop bracket 125. The ledger cam 121 is adapted to be swung between cam follower engage and non-engage positions as shown in solid and dashed lines respectively in FIGURE 4 with the actual movement between said positions being only a matter of several degrees. Actuation of the cam between positions is achieved by means of the movement of piston rod 130 of air cylinder 131, the latter being supported on a vertical post 132 mounted on a suitable frame member. The air cylinder 131 is adapted to be operated in timed relation with the reciprocating movement of the rotary cutter assembly 40 and clamping ledger 100 in such manner as to swing the ledger cam 121 counter-clockwise against the forward stop 135 of the stop bracket 125 during the time actual cutting of the filter rod is taking place, the actual cutting occurring during the forward stroke of the reciprocating cycle. In this position of the cam 121, the camming surface 122 thereof lies in and along the path of movement of the cam follower 136 fixedly connected to the top of the clamping ledger 100. Thus, when the clamping ledger 100 is moving through the forward stroke of the reciprocating cycle, the cam follower 136 engages the camming surface 122 of the ledger cam 121 causing application of a levering force to the upper jaw member 103 of the clamping ledger tending to rotate same clockwise as seen in FIGURE 3 and into firm clamping contact with the continuous filter rod. During the return stroke of the clamping ledger 100 and rotary cutter assembly 40 reciprocating cycle, the air cylinder piston rod 130 strokes to the left as seen in FIGURE 3 thereby moving the ledger cam 121 out of the path of travel of the cam follower 136 and the springs 105 swing the upper jaw member 103 counter-clockwise (FIGURE 3) to an open or non-clamp position.

The air motor 44 which drives the cutter blade 45 and is supplied by means of air hose 140 from a source of air under pressure is adapted to rotate the rotary blade at speeds up to forty thousand r.p.m. This is an important feature of the invention as will appear later. Moreover, the cutter blade can be rotated at these high speeds independently of the speed at which the rotary cutter assembly is reciprocated. Because of the high cutting r.p.m. involved it is necessary that the heat generated at the periphery of the cutter blade 45 during the course of cutting be dissipated and that furthermore, lubricant, as for example, a silicone be applied to the blade periphery. To that end, the rotary cutter blade assembly is provided with a reservoir 150 of suitable shape and which is supported on the air motor ring brackets 42 and 43. The reservoir is provided with a hollow interior, the latter being in communication with a wick holder 151 mounted at the side of the reservoir as shown. The wick holder is slotted as at 152 (FIGURE 4) so that the cutter blade as it rotates, passes therethrough. The wick holder 151 carries a wick 153 of conventional construction which extends inwardly of the reservoir thereby being continuously wetter by a supply of silicone contained in the reservoir 150. The rotating cutter blade rotates in contact with the wick and silicone becomes deposited on the blade periphery. The silicone serves both as a cutting lubricant and a blade coolant.

The rotary cutter of the present invention is particularly suited for sectioning continuous filter rod made from microfibers. The latter are a synthetic which is particularly sensitive to pressure and therefore require that cutting be achieved with a straight through cut at uniform speed to obviate bending the fibers. Experimental work with hand cutters and with prior art machine cutters used for sectioning continuous filter rod indicates that with respect to certain types of filter material, the impact velocity of the cutter blade (the rate at which the cutter buade is carried through the cigarette filter rod) has a definite effect on the quality of the cut obtainable. Therefore, the ratio of cutter blade peripheral speed to the impact speed of the cutter blade as it penetrates the filter rod was calculated and for convenience referred to as the "impact ratio." To obtain optimum cuts of microfibers, the "impact ratio" should lie within a predetermined range.

Thus, the impact ratio may be calculated as:

$$\frac{\text{cutter blade peripheral speed}}{\text{cutter blade impact velocity}} = \text{impact ratio}$$

Barely acceptable cuts (that is without major fiber distortion) were made of microfiber filter material at an impact ratio of:

$$\frac{100 \text{ ft./sec.-blade peripheral speed}}{0.25 \text{ ft./sec.-impact velocity}} = 400:1, \text{ impact ratio}$$

The optimum cut for microfiber material and as determined experimentally requires an impact ratio of:

$$\frac{130 \text{ ft./sec.}}{0.25 \text{ ft./sec.}} = 520:1, \text{ impact ratio}$$

It can be seen then that if the impact velocity of the cutter blade is very low, the peripheral speed of the cutter blade can be of relatively lower value. Hence, for a given blade diameter, the r.p.m. of the cutter blade can be given a correspondingly lower value. However, the lower values of impact velocity of the cutter blade are limited since impact velocity is a function of the number of cuts per minute which are required to be made. For example, if the forming machinery on which the filter rod is fabricated has an output of about 330 feet of rod per minute and it is desired to section the filter rod into lengths of 200 mm. for use on a particular type of cigarette making machine, the rotary cutter will be required to cut approximately 500 sections per minute. This requires that the cutter blade be moved into and out of cutting contact with the continuous filter rod a corresponding number of times per minute. Thus, the impact velocity even for a short oscillating stroke of the rotary cutter assembly is relatively high. It follows then that the cutter blade peripheral speed must be relatively high to keep the impact ratio within the range enumerated above when cutting microfibers. In a representative embodiment, the required r.p.m. for a 3½ inch cutter blade cutting through microfiber filter rod at an output of 500 units per minute is 40,000 r.p.m. This is considerably higher than the maximum speed range employed in prior art cutters having speeds of around 10,000 r.p.m. maximum.

Further understanding of the invention will be had from reference to the description of the manner in which the rotary cutter operates and which now follows.

Figure 5:
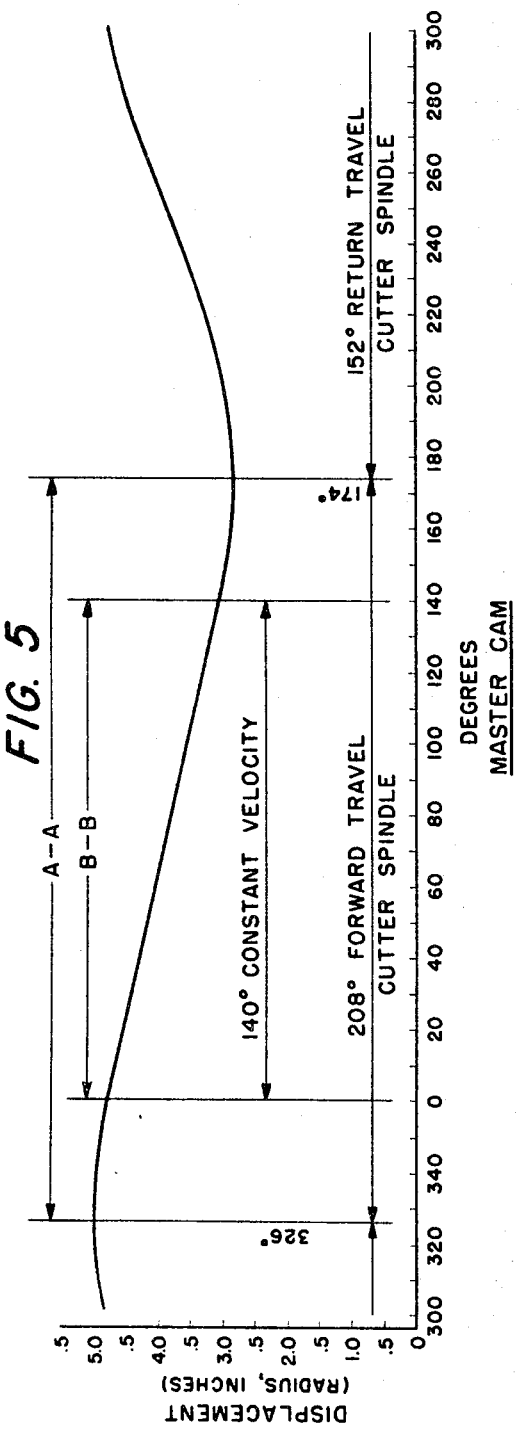
FIGURE 5 is a diagrammatical representation of the profile of the master cam used for imparting reciprocating motion to the rotary cutter and clamping ledger.

The continuous filter rod on leaving the forming machinery (not shown) is directed in a longitudinal course X—X as seen in FIGURE 4, the course being such that it passes through the ledger clamp, the upper and lower jaw members thereof having arcuate grooves corresponding to the surface shape of the filter rod and against which the filter rod engages when the ledger clamp is in a clamp position. The cutting of one section of predetermined length from the continuous filter rod requires that the rotary cutter assembly be reciprocated one complete cycle and that it be oscillated into and out of contact with the filter rod one complete cycle. The forward stroke of the rotary cutter assembly 40 is effected by means of the master cam 60, as it rotates and in particular by the profile section A—A thereof shown diagrammatically in FIGURE 5. During the forward stroke of the rotary cutter assembly, the ledger clamp 100 is given like movement since it is fixedly connected for movement in unison therewith as previously described. Also it is necessary during the actual cutting of the filter rod 65, that the rotary cutter assembly, the ledger clamp 100 and the filter rod 65 move at the same constant longitudinal speeds. This particular longitudinal speed is imparted to the rotary cutter assembly and ledger clamp during a portion of the reciprocating cycle forward stroke the latter occurring when the cam follower means 57, 58 is in contact with the cam profile segment B—B as shown in FIGURE 5.

Figure 6:
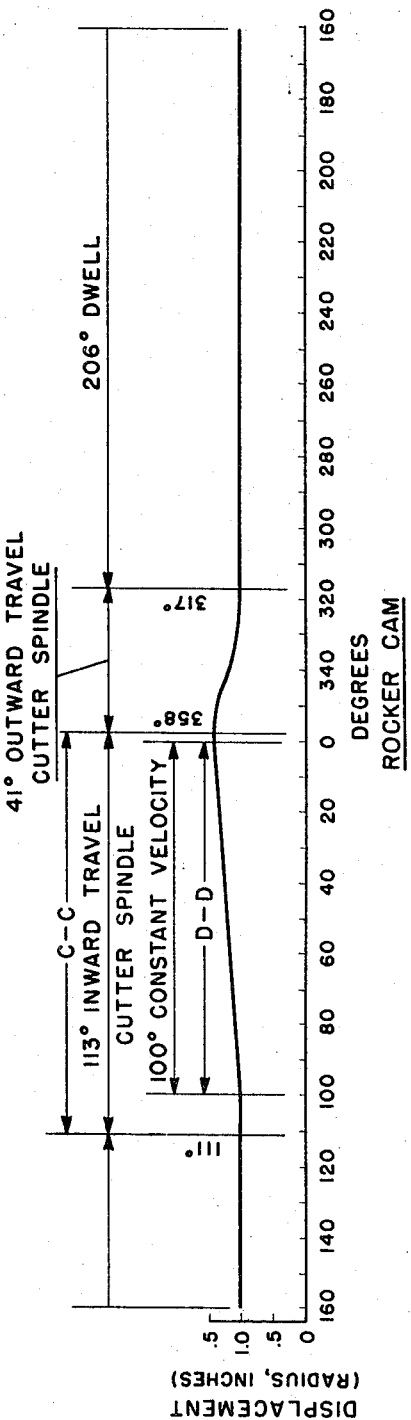
FIGURE 6 is a diagrammatical representation of the cam profile of the rocker cam used for rocking the rotary cutter into and out of cutting contact with the continuous rod.

Simultaneous with the forward stroking of the rotary cutter assembly and the ledger clamp, it is necessary that the cutter assembly be rocked from the position shown in long and short dashed lines in FIGURE 2 to the cutting position generally indicated in solid lines in the same figure. The latter is done by the action of the rocker cam 80 which it will be noted has a profile segment C—C, FIGURE 6, designed to produce inward travel during at least a part of the time period of the forward stroking of the rotary cutter blade assembly. The cam 80 is designed to produce a uniform angular or impact velocity of the cutter blade 45 during the time it actually is in cutting contact with the filter rod. The latter is provided by the cam profile section D—D shown in FIGURE 6.

During the actual cutting of the filter rod, it is firmly clamped in the clamping ledger by means of the air cylinder 131 which is designed to operate in known manner in timed relation with the reciprocating movement of the rotary cutter assembly and ledger clamp. Thus, during the forward stroke of the reciprocating cycle the air cylinder 131 will operate to stroke the piston rod 130 to the right as seen in FIGURES 3 and 4 moving the ledger cam 121 into a position wherein it is engaged with the cam follower 136 during the major portion of the forward stroke. The engagement of the ledger cam 121 with the cam follower clamps the ledger 100 by pivoting the upper jaw member 103 clockwise as seen in FIGURE 3 into firm clamping contact with the filter rod. The ledger clamp 100 is provided with a vertically slotted portion 160 into which the rotary cutter blade 45 enters when making the actual cut of the filter rod.

FIGURE 7 illustrates the velocity curves for the master cam 60 and rocker cam 80. That the impact velocity of the cutter blade 45 during actual cutting is constant is represented by the segment E—E. That the master cam imparts a constant longitudinal speed to the rotary cutter assembly during actual cutting which is the same as that of the advancing filter rod is depicted by the segment F—F in FIGURE 7.

Various other changes and different embodiments could be made within the principles described in the foregoing and it is intended that all matter set out therein or shown in the accompanying drawings shall be interpreted as illustrative and not in a limiting sense.

We claim:
1. In apparatus for cutting an article of continuous length advancing in a fixed longitudinal course at a uniform speed into sections of predetermined length, a rotary cutter assembly including a cutter blade adapted to rotate in a plane transverse to said longitudinal course and independent drive means for rotating said cutter blade, a rocker frame adapted to support said rotary cutter assembly adjacent said longitudinal course and for sliding movement parallel therewith a linkage having a rocker shaft slidable parallel with said longitudinal course and connected with said rotary cutter assembly, and a master cam connected to said linkage and operative to reciprocate said rocker shaft one cycle each time said article advances a distance equal to the length of the sections being cut therefrom, said master cam having a profile section thereon imparting a longitudinal speed to said rocker shaft during a portion of the advance stroke of the reciprocating cycle which is equal to the speed of advance of said article, and means for oscillating said rocker frame laterally of said longitudinal course one cycle each time said article advances said distance thereby to move said cutter blade into and out of cutting contact with said article, said means including a rocker cam operable to cause said cutter blade to move into cutting contact with said article during the portion of said reciprocating cycle advance stroke when said rotary cutter assembly has a longitudinal speed equal to the speed of advance of said article, said cam having a profile section thereon imparting to said rocker frame a constant velocity of oscillation when said cutter blade is in cutting contact with said article.

2. Apparatus as set forth in claim 1 wherein said independent drive means for rotating said cutter blade comprises an air motor.

3. Apparatus as set forth in claim 2 wherein said air motor is capable of rotating said cutter blade at speeds in a range up to 40,000 r.p.m.

4. Apparatus as set forth in claim 2 wherein said rocker frame comprises as a unitary construction an upper shaft disposed parallel to said longitudinal course, a lower beam member spaced parallel with said upper shaft, and side members connecting the ends of said upper shaft with the ends of said lower beam member, said side members being supported for pivoting movement about an axis parallel to said longitudinal course, said air motor being slidably supported on said upper shaft.

5. Apparatus as set forth in claim 4 wherein a block is slidably mounted on said upper shaft, and a pair of ring brackets are fixed to said sliding block, said air motor being supported in said ring brackets.

6. Apparatus in accordance with claim 5 wherein said block has a lower ear-like extension, said extension having an opening extending therethrough for receiving loosely said rocker shaft, said rocker shaft having locking collars secured thereto at opposite sides of said extension.

7. Apparatus as set forth in claim 1 further comprising means for applying lubricant to the periphery of said cutter blade as it rotates.

8. Apparatus as set forth in claim 7 wherein said means for applying lubricant comprises a wick means engaging the periphery of said cutter blade, a holder for said wick means, and a reservoir for supplying lubricant to said wick means.

9. Apparatus in accordance with claim 8 wherein said reservoir is fixedly connected with said rotary cutter assembly, said holder being connected to one side of said reservoir and having a slotted portion therein in which said wick means extends, the periphery of said cutter blade extending into said slotted portion.

10. Apparatus in accordance with claim 7 wherein said lubricant is silicone.

11. Apparatus in accordance with claim 1 wherein said rocker cam is a rotary cam having a track profile therein, said rocker frame being provided with a cam follower means engaging the track in said rocker cam.

12. Apparatus in accordance with claim 1 wherein said master cam is a ribbon type rotary cam, the ribbon having parallel spaced faces constituting the profile of said master cam, said linkage including a follower shaft carrying follower means engaging the faces of said ribbon.

13. Apparatus as set forth in claim 1 further comprising a clamp means operable to hold said article as it is being cut, and means operatively connecting said clamp means with said rotary cutter assembly thereby to cause said clamp means to reciprocate in unison therewith.

14. Apparatus in accordance with claim 13 wherein said clamp means comprises upper and lower pivoted clamp members having each a groove complemental with a groove in the other for receiving said article, means normally biasing said upper clamp member in a direction away from said lower clamp member, an arm fixed to said upper clamp member and carrying a roller thereon, and a plate having a camming surface thereon against which said roller engages during reciprocation of said clamp means to pivot said upper clamp member towards said lower clamp member and into clamping engagement with said article to hold same as it is being cut.

15. Apparatus in accordance with claim 14 wherein the means connecting said clamp means with said rotary cutter assembly comprises a bracket assembly supported for sliding movement parallel to said longitudinal course, said bracket assembly being connected with said lower clamp member and said rocker shaft.

16. Apparatus in accordance with claim 14 wherein said plate is supported for movement between a first position wherein the camming surface thereon is engageable with the roller on said upper clamp member and a second position wherein said camming surface is non-engageable with said roller, and wherein means are provided for operating said plate between said positions in timed relation with the reciprocating movement of said clamp members.

17. Apparatus in accordance with claim 16 wherein the means for operating said plate between said first and second positions comprises an air cylinder having a rod connected with said plate, said air cylinder stroking said rod in one direction to move said plate to said first position during the forward stroke of the reciprocating cycle of said rotary cutter assembly, said air cylinder stroking said rod in an opposite direction to move said plate to said second position during the return stroke of said reciprocating cycle.

References Cited

UNITED STATES PATENTS

| | | | |
|---|---|---|---|
| 1,597,800 | 8/1926 | Johnstone | 83—169 |
| 3,044,336 | 7/1962 | Bock | 83—319 |
| 3,298,266 | 1/1967 | Molnar | 83—318 |

ANDREW R. JUHASZ, *Primary Examiner.*

UNITED STATES PATENT OFFICE
CERTIFICATE OF CORRECTION

Patent No. 3,380,329            April 30, 1968

George L. Mathe et al.

It is certified that error appears in the above identified patent and that said Letters Patent are hereby corrected as shown below:

Column 1, line 27, "impairing" should read -- imparting --. Column 7, line 8, "buade" should read -- blade --. Column 8, line 68, after "therewith" insert a comma.

Signed and sealed this 30th day of September 1969.

(SEAL)

Attest:

Edward M. Fletcher, Jr.            WILLIAM E. SCHUYLER, JR.

Attesting Officer                   Commissioner of Patents